United States Patent [19]

Hayes et al.

[11] 4,358,405

[45] Nov. 9, 1982

[54] PROCESS FOR THE PREPARATION OF ETHYLENIMINE

[75] Inventors: William V. Hayes, Clute; David L. Childress, Angleton, both of Tex.

[73] Assignee: The Dow Chemical Co., Midland, Mich.

[21] Appl. No.: 247,480

[22] Filed: Mar. 25, 1981

Related U.S. Application Data

[62] Division of Ser. No. 169,563, Jul. 17, 1980, Pat. No. 4,289,656.

[51] Int. Cl.$^3$ ............................................. C07D 203/02
[52] U.S. Cl. .................................................. 260/239 E
[58] Field of Search ..................................... 260/239 E

[56] References Cited

PUBLICATIONS

Agawa, Chem. Abs. 83, 163983a.

*Primary Examiner*—Mark L. Berch
*Attorney, Agent, or Firm*—A. C. Ancona

[57] ABSTRACT

A dehydration catalyst and process for making an alkylenimine from an alkanolamine wherein the catalyst contains oxides of either tantalum or niobium together with the oxides of iron and chromium and in which the ratios of the metals are:

$$M_{10}Fe_{0.5-2.9}Cr_{0.3-1.7}$$

wherein M is tantalum or niobium.

4 Claims, No Drawings

PROCESS FOR THE PREPARATION OF ETHYLENIMINE

CROSS REFERENCE TO RELATED APPLICATION

This is a divisional of application Ser. No. 169,563, filed July 17, 1980, now U.S. Pat. No. 4,289,656.

This invention relates to the preparation of ethylenimine by a catalytic dehydration of monoethanolamine in the vapor phase over a new and improved catalyst therefor.

BACKGROUND OF THE INVENTION

Ethylenimine (EI) is an active three-membered cyclic amine and is a very useful compound since it can introduce an amino group by an addition reaction, substitution reaction, ring opening reaction and the like. Ethylenimine is especially important as an aminoethylation agent of compounds containing an active hydrogen. It is also useful as a monomer for polyamine-type polymers in homo and co-polymerizations. In addition to all of these uses, it is also possible to prepare derivatives which retain the ring opening reactivity of ethylenimine through an addition reaction of the amino group. All of these features make ethylenimine an important substance both chemically and industrially.

Ethylenimine can be synthesized by one of several methods. One is the Gabriel method in which a beta-halo-ethylamine undergoes a ring closure through a treatment with a concentrated base or silver oxide. Another involves the reaction of ethylene chloride (1,2-dichloroethane) with anhydrous ammonia in the presence of a base. This reaction and equivalent reactants to form EI and substituted EI's are disclosed in U.S. Pat. No. 3,336,294. Yet another preparation of EI involves a decomposition (ring closure) of monoethanolamine sulfuric acid ester by hot concentrated base. Each of the above methods present certain disadvantages. For example, it is necessary to control the reaction conditions strictly to synthesize both beta-halo-ethyl amine and monomethanolamine sulfuric acid ester. The syntheses tend to be accompanied by side reaction and side products. All of these problems make these starting materials very expensive. At the same time, the halogen and sulfuric acid ester group which are introduced in the syntheses are removed in the subsequent process making these syntheses wasteful from the stand point of the functional group utilization. Furthermore, both processes use a base for the ring closure reaction. The bases most often used are sodium hydroxide and potassium hydroxide and these bases are used as concentrated solutions in large quantities. Thus the base requirement per ethylenimine unit is very high and uneconomical. The by products, NaCl, $Na_2SO_4$ or the potassium equivalents, are a further expense since they have little value and must be disposed of. The lost chlorine values in the method using 1,2 dichloroethane makes this process an expensive one. None of the art processes are readily made continuous so as to be more attractive commercially.

A more recent process involving the vapor phase dehydration of monoethanolamine is disclosed in Japanese Patent Publication No. 50-10593/1975. A catalyst of tungsten oxide alone or preferable with another metal oxide as an assistant is employed. The metal oxide assistant includes lithium, magnesium, tin, bismuth, molybdenum, nickel and aluminum oxides.

The reaction is conducted at a temperature of 350° C. to 450° C. preferably using an inert diluent gas such as ammonia or nitrogen. Conversions of up to 45% and selectivities of as high as 66% are reported.

The present invention is also a vapor phase dehydration of ethanolamine, but employs a different catalyst giving an improved result. The catalyst for the reaction is composed of oxides of niobium or tantalum in combination with iron and chromium oxides.

DETAILED DESCRIPTION OF THE INVENTION

The oxides of tantalum or niobium when combined with iron and chromium oxides produce an excellent catalyst useful for the dehydration of alkanolamines to form alkylenimines.

The catalytic components for the catalyst in the present invention can be combined in ways known to the art, e.g. in a solution which is then impregnated onto a support, or incorporated on the support from a slurry or the components may be mixed in slurry or solution, dried and compressed into a pellet.

The following is a representative method of preparation for the catalyst of this invention. A solution of 135.1 gms niobium pentoxide, 87.8 gms ferric nitrate, and 16 gms of ammonium dichromate was prepared in 200 cc of water and this solution poured over 230 gms of low surface area (0.02–0.2 $m^2/g$) silicon carbide catalyst support. The excess water was removed on a steam bath and oven-dried for 1 hour at 150° C. The catalyst was then air-calcined at 710° C. for 4 hours. This preparation resulted in a 37.9 wt. % loading of metal oxides on the support in which the ratio of metals was $Nb_{10}$ $Fe_{2.13}$ $Cr_{1.25}$.

This catalyst (130 cc) was loaded into a single tube stainless steel reactor 4'×⅜" and run under the following conditions: reactor temperature—412° C., reactor pressure—4.0 psig, open tube contact time—0.437 sec., molar ratio of feed: ammonia/MEA=11.8/1.

| | |
|---|---|
| Monoethanolamine (MEA) conversion | 42.7% |
| Ethylenimine (EI) selectivity | 83.1% |
| Ethylene diamine (EDA) selectivity | 2.0% |
| Aminoethylaziridine (AEA) selectivity | 5.6% |

In like manner other catalysts containing different ratios of the metals were employed for the dehydration. Table I shows the result of Examples 2-5 and Comparative Examples A, B and C.

TABLE I

| Ex. No. | Atomic Ratios | | | | | MEA Conv. % | % Selectivity | | |
|---|---|---|---|---|---|---|---|---|---|
| | Nb | Fe | Cr | W | Li | | EI | EDA | AEA |
| 2 | 10 | 1.07 | .625 | — | — | 40.0 | 67.0 | 8.2 | 16.2 |
| 3 | 10 | .54 | .31 | — | — | 34.2 | 70.0 | 4.9 | 16.0 |
| 4 | 10 | 1.07 | .64 | — | — | 36.5 | 69.8 | 3.7 | 10.3 |
| 5 | 10 | 1.07 | .64 | — | 2.82 | 48.7 | 64.5 | 2.0 | 1.4 |
| A | 10 | 2.36 | — | — | — | 22.8 | 72.5 | 3.4 | 9.5 |
| B | 10 | — | 2.15 | — | — | 13.3 | 63.3 | 5.0 | 0 |

TABLE I-continued

| Ex. No. | Atomic Ratios | | | | | MEA Conv. % | % Selectivity | | |
|---|---|---|---|---|---|---|---|---|---|
| | Nb | Fe | Cr | W | Li | | EI | EDA | AEA |
| C | 10 | — | — | 3.47 | — | 24.2 | 59.5 | 2.8 | 2.8 |

It should be noted that the conversions, when either chromium or iron is absent, as in Comparative Examples A and B, respectively, fall off drastically, although the selectivity to EI remains in about the same range of 60–70%. The same is true when tungsten, a known prior art catalyst, is substituted for the chromium and iron.

In the above catalyst, tantalum may be substituted for the niobium. The following Example 6 shows the preparation of such a catalyst.

EXAMPLE 6

A solution of 65.6 gms of ferric nitrate in 400 cc's of deionized water was prepared. To this solution was added 124.1 gms of colloidal tantalum pentoxide. Another solution of 50 cc's deionized water and 12.0 gms ammonium dichromate was made and added to the first solution. This mixture was then coated on 230 gms of a low surface area silicon carbide support and the excess water removed on a steam bath. The catalyst was oven dried at 150° C. for one hour and then air calcined at 710° C. for four hours. The finished catalyst contained metal ratios of $Ta_{10} Fe_{2.89} Cr_{1.69}$. 150 mls of catalyst prepared in the above manner was placed in a ¾ inch I.D. stainless steel single tube reactor and run under the following conditions: mole ratio of 1:1:6:19—monoethanolamine:water:ammonia:nitrogen, reactor temperature—360° C. Monoethanolamine conversion was 58% with selectivity to ethylenimine of 25% over a seven-hour period.

Thus, the catalyst of the present invention encompass those having a formula as follows:

$$M_{10} Fe_{0.5-2.9} Cr_{0.3-1.7}.$$

A more preferred catalyst is one having the formula:

$$M_{10} Fe_{2.1} Cr_{1.3}$$

wherein M is either Nb or Ta.

The conditions of the dehydration reaction employing the catalyst of the invention are an operable temperature of 350° C. to 450° C., a pressure of from about ambient to about 10 psig, a contact time of from about 0.1 to about 5.0 seconds. The feed is the ethanolamine with an inert diluent gas, which may be nitrogen or ammonia, in a ratio of diluent to amine of about 35:1 to about 2:1.

We claim:

1. A process for making an ethylenimine by the vapor phase dehydration of an ethanolamine over a catalyst which comprises the oxides of niobium or tantalum and iron and chromium wherein the atomic ratio of the metals is:

$$M_{10} Fe_{0.5-2.9} Cr_{0.3-1.7}$$

wherein M is tantalum or niobium.

2. The process of claim 1 wherein the ratios of metals in the catalyst employed are:

$$M_{10} Fe_{1.0-2.1} Cr_{0.6-1.3}.$$

3. The process of claim 1 wherein the conditions of the reaction include a reactor temperature in the range of from about 350° to about 450° C., a pressure of from about ambient to about 10 psig, a contact time of from about 0.1 to about 5 seconds and a feed of inert diluent gas and ethanolamine at a ratio of diluent to amine of from about 35:1 to about 2:1.

4. The process of claim 3 wherein the inert diluent gas is nitrogen or ammonia.

* * * * *